United States Patent
Zhou

(10) Patent No.: US 11,929,836 B2
(45) Date of Patent: Mar. 12, 2024

(54) FEEDBACK METHOD AND APPARATUS FOR GRANT-FREE UPLINK TRANSMISSION, AND STORAGE MEDIUM

(71) Applicant: BEIJING XIAOMI MOBILE SOFTWARE CO., LTD., Beijing (CN)

(72) Inventor: Juejia Zhou, Beijing (CN)

( * ) Notice: Subject to any disclaimer, the term of this patent is extended or adjusted under 35 U.S.C. 154(b) by 504 days.

(21) Appl. No.: 17/272,633

(22) PCT Filed: Sep. 5, 2018

(86) PCT No.: PCT/CN2018/104110
§ 371 (c)(1),
(2) Date: Mar. 1, 2021

(87) PCT Pub. No.: WO2020/047765
PCT Pub. Date: Mar. 12, 2020

(65) Prior Publication Data
US 2021/0344458 A1  Nov. 4, 2021

(51) Int. Cl.
*H04L 1/1867* (2023.01)
*H04L 1/1607* (2023.01)
(Continued)

(52) U.S. Cl.
CPC .......... *H04L 1/1896* (2013.01); *H04L 1/1614* (2013.01); *H04L 5/0055* (2013.01);
(Continued)

(58) Field of Classification Search
CPC ... H04L 1/1614; H04L 1/1896; H04L 5/0055; H04W 74/08; H04W 72/0446; H04W 72/0453; H04W 72/121
See application file for complete search history.

(56) References Cited

U.S. PATENT DOCUMENTS

| 10,205,574 B2 | 2/2019 | Suzuki et al. |
| 2011/0032925 A1* | 2/2011 | Lee ........................ H04L 1/1621 370/345 |

(Continued)

FOREIGN PATENT DOCUMENTS

| CN | 101860896 A | 10/2010 |
| CN | 102595624 A | 7/2012 |

(Continued)

OTHER PUBLICATIONS

Nokia, Alcatel-Lucent Shanghai Bell; "Transmission Options for the mMTC Grant-Free Uplink"; Agenda item: 8.1.1.2 3GPP TSG-RAN WG1 #86bis Lisbon, Portugal Oct. 10-14, 2016 R1-1609783 (Year: 2016).*

(Continued)

*Primary Examiner* — Gary Mui
(74) *Attorney, Agent, or Firm* — Syncoda LLC; Feng Ma

(57) ABSTRACT

A feedback method for grant-free uplink transmission includes: receiving, by an access network device, uplink data sent by a UE in a UE group, wherein the UE group includes n UEs, n being a positive integer; sending, by the access network device, downlink feedback information in a group common search space corresponding to the UE group, wherein the downlink feedback information indicates uplink transmission success/failure of the UE group. For the grant-free uplink transmission, the UE group can be acquired by grouping the UE, the access network device can send the downlink feedback information in the group common search space corresponding to the UE group, and the uplink transmission success/failure of the UE group can be indicated by the downlink feedback information.

20 Claims, 11 Drawing Sheets

(51) Int. Cl.
  *H04L 5/00* (2006.01)
  *H04W 72/0446* (2023.01)
  *H04W 72/0453* (2023.01)
  *H04W 72/121* (2023.01)

(52) U.S. Cl.
  CPC ... *H04W 72/0446* (2013.01); *H04W 72/0453* (2013.01); *H04W 72/121* (2013.01)

(56) References Cited

U.S. PATENT DOCUMENTS

| | | | |
|---|---|---|---|
| 2018/0123765 A1* | 5/2018 | Cao | H04L 1/1861 |
| 2019/0075581 A1* | 3/2019 | Salem | H04W 16/14 |
| 2019/0223203 A1* | 7/2019 | Zhang | H04L 5/0048 |
| 2019/0349965 A1* | 11/2019 | Chakraborty | H04W 16/14 |
| 2019/0363833 A1* | 11/2019 | Wang | H04L 1/1819 |
| 2020/0037314 A1* | 1/2020 | Xiong | H04L 1/08 |
| 2020/0044791 A1* | 2/2020 | Tsai | H04L 1/1854 |
| 2020/0052825 A1* | 2/2020 | Sarkis | H04W 72/121 |
| 2021/0111835 A1* | 4/2021 | Khoshnevisan | H04L 5/0055 |
| 2021/0111838 A1* | 4/2021 | Utkovski | H04L 1/1893 |
| 2021/0282118 A1* | 9/2021 | Zuo | H04L 1/1893 |

FOREIGN PATENT DOCUMENTS

| | | |
|---|---|---|
| CN | 104199016 A | 12/2014 |
| CN | 107148789 A | 9/2017 |
| CN | 107889264 A | 4/2018 |
| CN | 108282782 A | 7/2018 |
| MX | 308276 B | 3/2013 |
| WO | 2016167581 A1 | 10/2016 |
| WO | 2018085485 A1 | 5/2018 |

OTHER PUBLICATIONS

International search report of PCT application No. PCT/CN2018/104110 dated May 16, 2019.
First office action of Chinese application No. 201880001259.4 dated Oct. 27, 2020.
OPPO, "Grant free transmission enhancement" 3GPP TSG RAN WG1 Meeting #94 R1-1808910, Aug. 10, 2018 (Aug. 10, 2018), sections 1 and 2.

* cited by examiner

FEEDBACK METHOD AND APPARATUS FOR GRANT-FREE UPLINK TRANSMISSION, AND STORAGE MEDIUM

CROSS-REFERENCE TO RELATED APPLICATIONS

The present application is a national stage of International Application No. PCT/CN2018/104110 filed on Sep. 5, 2018, the disclosure of which is hereby incorporated by reference in its entirety.

TECHNICAL FIELD

The present disclosure relates to the field of communication technologies, and in particular, relates to a feedback method and apparatus for grant-free uplink transmission, and a storage medium.

BACKGROUND

In a long-term evolution (LTE) system, downlink control information (DCI) is carried by a physical downlink control channel (PDCCH), and downlink control information sent by a base station to a user equipment (UE) includes uplink and downlink resource allocation information, hybrid automatic repeat request (HARQ) information, power control information, and the like.

In the LTE system, an HARQ mechanism performs retransmission in units of transport blocks (TBs). Downlink feedback information sent by the base station to the UE includes feedback information corresponding to each TB, and the feedback information corresponding to a TB indicates transmission success/failure of this TB. In the LTE system, the base station may send the downlink feedback information in a UE-specific search space corresponding to the UE.

In a 5G new radio (NR) system, grant-free uplink (GUL) transmission, i.e., uplink transmission that does not require uplink scheduling each time, is introduced. For GUL, it may need to decide a base station gives feedback on uplink transmission success/failure of the UE.

SUMMARY

Embodiments of the present disclosure provide a feedback method and apparatus for grant-free uplink transmission, and a storage medium, which may solve the problem of how a base station gives feedback on uplink transmission success/failure of a UE with respect to GUL transmission. The technical solutions are as follows.

According to a first aspect of the embodiments of the present disclosure, a feedback method for grant-free uplink transmission is provided. The method includes:

receiving, by an access network device, uplink data sent by a UE in a UE group, wherein the UE group includes n UEs, n being a positive integer; and sending, by the access network device, downlink feedback information in a group common search space corresponding to the UE group, wherein the downlink feedback information indicates uplink transmission success/failure of the UE group.

Optionally, the downlink feedback information includes: feedback information corresponding to target UE of the n UEs, wherein the feedback information corresponding to the target UE indicates transmission success/failure of uplink data sent by the target UE.

Optionally, the downlink feedback information includes: an AND operation result of feedback information respectively corresponding to m UEs of the n UEs, m being a positive integer less than or equal to n, wherein the feedback information corresponding to target UE of the m UEs indicates transmission success/failure of uplink data sent by the target UE.

Optionally, the uplink data sent by the target UE includes k code block groups (CBGs), k being a positive integer; and the feedback information corresponding to the target UE includes: feedback information corresponding to the k CBGs respectively, wherein the feedback information corresponding to a $w^{th}$ CBG of the k CBGs indicates transmission success/failure of the $w^{th}$ CBG, w being a positive integer less than or equal to k.

Optionally, the uplink data sent by the target UE includes k CBGs, k being a positive integer; and the feedback information corresponding to the target UE includes: an AND operation result of feedback information corresponding to the k CBGs receptively, wherein the feedback information corresponding to a $w^{th}$ CBG of the k CBGs indicates transmission success/failure of the $w^{th}$ CBG, w being a positive integer less than or equal to k.

Optionally, the method further includes:

sending, by the access network device, the feedback information corresponding to the k CBGs receptively in a UE-specific search space corresponding to the target UE when the feedback information corresponding to the target UE indicates the transmission failure of the uplink data sent by the target UE.

Optionally, the method further includes:

sending, by the access network device, the feedback information corresponding to the target UE in a UE-specific search space corresponding to the target UE.

Optionally, the method further includes:

allocating, by the access network device, the n UEs, whose transmission cycles meet a predetermined condition, to the same UE group, wherein the predetermined condition includes any one of: a time interval between transmission cycles of two UEs being less than a first threshold; and a time interval between a transmission cycle of the UE and a target time point being less than a second threshold.

Optionally, the method further includes:

sending, by the access network device, location information of the downlink feedback information to the target UE in the UE group, wherein the location information indicates a location of the downlink feedback information in the group common search space.

According to a second aspect of the embodiments of the present disclosure, a feedback method for grant-free uplink transmission is provided. The method is applicable to a target UE in a UE group, wherein the UE group includes n UEs, n being a positive integer; and the method includes:

sending, by the target UE, uplink data to an access network device; and acquiring, by the target UE, downlink feedback information sent by the access network device in a group common search space corresponding to the UE group, wherein the downlink feedback information indicates uplink transmission success/failure of the UE group.

Optionally, the downlink feedback information includes: feedback information corresponding to the target UE, wherein the feedback information corresponding to the target UE indicates transmission success/failure of uplink data sent by the target UE.

Optionally, the downlink feedback information includes: an AND operation result of feedback information respectively corresponding to m UEs of the n UEs, m being a positive integer less than or equal to n, wherein the feedback information corresponding to the target UE of the m UEs indicates transmission success/failure of uplink data sent by the target UE.

Optionally, the uplink data sent by the target UE includes k CBGs, k being a positive integer; and the feedback information corresponding to the target UE includes: feedback information corresponding to the k CBGs respectively, wherein the feedback information corresponding to a $w^{th}$ CBG of the k CBGs indicates transmission success/failure of the $w^{th}$ CBG, w being a positive integer less than or equal to k.

Optionally, the uplink data sent by the target UE includes k CBGs, k being a positive integer; and the feedback information corresponding to the target UE includes: an AND operation result of feedback information corresponding to the k CBGs receptively, wherein the feedback information corresponding to a $w^{th}$ CBG of the k CBGs indicates transmission success/failure of the $w^{th}$ CBG, w being a positive integer less than or equal to k.

Optionally, the method further includes:

acquiring, by the target UE, the feedback information corresponding to the k CBGs receptively in a UE-specific search space corresponding to the target UE when the feedback information corresponding to the target UE indicates the transmission failure of the uplink data sent by the target UE.

Optionally, the method further includes:

acquiring, by the target UE, the feedback information corresponding to the target UE in a UE-specific search space corresponding to the target UE.

Optionally, the method further includes:

receiving, by the target UE, location information of the downlink feedback information sent by the access network device, wherein the location information indicates a location of the downlink feedback information in the group common search space.

According to a third aspect of the embodiments of the present disclosure, a feedback apparatus for grant-free uplink transmission is provided. The apparatus is applicable to an access network device and includes:

a receiving module, configured to receive uplink data sent by a UE in a UE group, wherein the UE group includes n UEs, n being a positive integer; and a sending module, configured to send downlink feedback information in a group common search space corresponding to the UE group, wherein the downlink feedback information indicates uplink transmission success/failure of the UE group.

Optionally, the downlink feedback information includes: feedback information corresponding to target UE of the n UEs, wherein the feedback information corresponding to the target UE indicates transmission success/failure of uplink data sent by the target UE.

Optionally, the downlink feedback information includes: an AND operation result of feedback information respectively corresponding to m UEs of the n UEs, m being a positive integer less than or equal to n, wherein the feedback information corresponding to target UE of the m UEs indicates transmission success/failure of uplink data sent by the target UE.

Optionally, the uplink data sent by the target UE includes k CBGs, k being a positive integer; and the feedback information corresponding to the target UE includes: feedback information corresponding to the k CBGs respectively, wherein the feedback information corresponding to a $w^{th}$ CBG of the k CBGs indicates transmission success/failure of the $w^{th}$ CBG, w being a positive integer less than or equal to k.

Optionally, the uplink data sent by the target UE includes k CBGs, k being a positive integer; and the feedback information corresponding to the target UE includes: an AND operation result of feedback information corresponding to the k CBGs receptively, wherein the feedback information corresponding to a $w^{th}$ CBG of the k CBGs indicates transmission success/failure of the $w^{th}$ CBG, w being a positive integer less than or equal to k.

Optionally, the sending module is further configured to send the feedback information corresponding to the k CBGs receptively in a UE-specific search space corresponding to the target UE when the feedback information corresponding to the target UE indicates the transmission failure of the uplink data sent by the target UE.

Optionally, the sending module is further configured to send the feedback information corresponding to the target UE in a UE-specific search space corresponding to the target UE.

Optionally, the apparatus further includes:

a grouping module configured to allocate the n UEs, whose transmission cycles meet a predetermined condition, to the same UE group, wherein the predetermined condition includes any one of: a time interval between transmission cycles of two UEs being less than a first threshold; and a time interval between a transmission cycle of the UE and a target time point being less than a second threshold.

Optionally, the sending module is further configured to send location information of the downlink feedback information to the target UE in the UE group, wherein the location information indicates a location of the downlink feedback information in the group common search space.

According to a fourth aspect of the embodiments of the present disclosure, a feedback apparatus for grant-free uplink transmission is provided. The apparatus is applicable to a target UE in a UE group, wherein the UE group includes n UEs, n being a positive integer. The apparatus includes:

a sending module, configured to send uplink data to an access network device; and an acquiring module, configured to acquire downlink feedback information sent by the access network device in a group common search space corresponding to the UE group, wherein the downlink feedback information indicates uplink transmission success/failure of the UE group.

Optionally, the downlink feedback information includes: feedback information corresponding to the target UE, wherein the feedback information corresponding to the target UE indicates transmission success/failure of uplink data sent by the target UE.

Optionally, the downlink feedback information includes: an AND operation result of feedback information respectively corresponding to m UEs of the n UEs, m being a positive integer less than or equal to n, wherein the feedback information corresponding to the target UE of the m UEs indicates transmission success/failure of uplink data sent by the target UE.

Optionally, the uplink data sent by the target UE includes k CBGs, k being a positive integer; and the feedback information corresponding to the target UE includes: feedback information corresponding to the k CBGs respectively, wherein the feedback information corresponding to a $w^{th}$ CBG of the k CBGs indicates transmission success/failure of the $w^{th}$ CBG, w being a positive integer less than or equal to k.

Optionally, the uplink data sent by the target UE includes k CBGs, k being a positive integer; and the feedback information corresponding to the target UE includes: an AND operation result of feedback information corresponding to the k CBGs receptively, wherein the feedback information corresponding to a $w^{th}$ CBG of the k CBGs indicates transmission success/failure of the $w^{th}$ CBG, w being a positive integer less than or equal to k.

Optionally, the acquiring module is further configured to acquire the feedback information corresponding to the k CBGs receptively in a UE-specific search space corresponding to the target UE when the feedback information corresponding to the target UE indicates the transmission failure of the uplink data sent by the target UE.

Optionally, the acquiring module is further configured to acquire the feedback information corresponding to the target UE in a UE-specific search space corresponding to the target UE.

Optionally, the apparatus further includes: a receiving module configured to receive location information of the downlink feedback information sent by the access network device, wherein the location information indicates a location of the downlink feedback information in the group common search space.

According to a fifth aspect of the embodiments of the present disclosure, a feedback device for grant-free uplink transmission is provided. The device is applicable to an access network device and includes:

a processor; and
memory configured to store at least one instruction executable by the processor, wherein
the processor is configured to:
receive uplink data sent by a UE in a UE group, wherein the UE group includes n UEs, n being a positive integer; and
send downlink feedback information in a group common search space corresponding to the UE group, wherein the downlink feedback information indicates uplink transmission success/failure of the UE group.

According to a sixth aspect of the embodiments of the present disclosure, a feedback device for grant-free uplink transmission is provided. The device is applicable to a target UE in a UE group, wherein the UE group includes n UEs, n being a positive integer. The device includes:

a processor; and
memory configured to store at least one instruction executable by the processor, wherein
the processor is configured to:
send uplink data to an access network device; and
acquire downlink feedback information sent by the access network device in a group common search space corresponding to the UE group, wherein the downlink feedback information indicates uplink transmission success/failure of the UE group.

According to a seventh aspect of the embodiments of the present disclosure, a non-transitory computer-readable storage medium is provided. The non-transitory computer-readable storage medium stores at least one computer program thereon. The at least one computer program, when loaded and run by a processor, causes the processor to perform steps of the method as described in the first or second aspect.

The technical solutions according to the embodiments of the present disclosure can achieve the following beneficial effects.

For the grant-free uplink transmission, the UE group is acquired by grouping the UE, the access network device sends the downlink feedback information in the group common search space corresponding to the UE group, and the uplink transmission success/failure of the UE group is indicated by the downlink feedback information.

It should be understood that both the foregoing general description and the following detailed description are exemplary and illustrative only and are not intended to limit the present disclosure.

BRIEF DESCRIPTION OF THE DRAWINGS

The accompanying drawings, which are incorporated in and constitute a part of the description, illustrate embodiments consistent with the present disclosure and, together with the description, serve to explain the principles of the present disclosure.

DETAILED DESCRIPTION

Exemplary embodiments are described in detail here, examples of which are illustrated in the accompanying drawings. Where the following description hereinafter refers to the accompanying drawings, the same numbers in different accompanying drawings represent the same or similar elements, unless otherwise represented. The embodiments set forth in the following description of exemplary embodiments do not represent all embodiments consistent with the present disclosure. Instead, they are merely examples of apparatuses and methods consistent with some aspects related to the present disclosure as recited in the appended claims.

The network architecture and service scenarios described in the embodiments of the present disclosure are intended to more clearly illustrate the technical solutions of the embodiments of the present disclosure, and do not constitute a limitation to the technical solutions according to the embodiments of the present disclosure. A person of ordinary skill in the art may know that with evolution of the network architecture and the emergence of new service scenarios, the technical solutions according to the embodiments of the present disclosure are equally applicable to similar technical problems.

Figure 1:
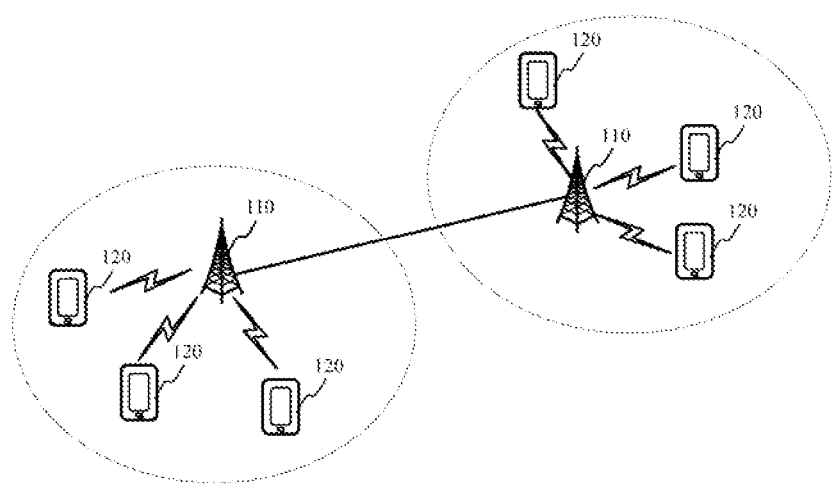
FIG. 1 is a structural diagram of a network architecture according to an exemplary embodiment.

FIG. 1 is a structural diagram of a network architecture according to an exemplary embodiment. The network architecture may include an access network device 110 and a UE 120.

The access network device 110 is deployed in an access network. The access network in the 5G NR system may be called a new generation-radio access network (NG-RAN). The access network device 110 and the UE 120 communicate with each other by the air interface technology, such as the cellular technology.

The access network device 110 may be a base station (BS) which is a device deployed in the access network for providing a wireless communication function for the UE. The base stations may include various forms of macro base stations, micro base stations, relay stations, access points, and the like. In a system adopting different wireless access technologies, devices with base station functions may be differently named. For example, in the 5G system, a base station is called gNodeB or gNB. With the evolution of communication technologies, the name "base station" may change. For convenience of description, in the embodiment of the present disclosure, the above devices that provide the wireless communication function for the UE are collectively called the access network device.

A plurality of UEs are usually provided, and one or more UEs 120 may be distributed in a cell managed by each access network device 110. The UE 120 may include various handheld devices, vehicle-mounted devices, wearable devices and computing devices, which have the wireless communication function, or other processing devices connected to wireless modems, and various forms of mobile stations (MS), terminal devices and the like. The UE may also be called the terminal. For convenience of description, in the embodiment of the present disclosure, the devices mentioned above are collectively called the UE.

The "5G NR system" described in the embodiment of the present disclosure may also be called a 5G system or an NR system, but a person skilled in the art may understand its meaning. The technical solution described in the embodiment of the present disclosure may be applicable to the 5G NR system, and may also be applicable to a subsequent evolution system of the 5G NR system.

The frequencies deployed in the 5G NR system are mostly in a frequency range with higher frequencies and may range from 3.3 GHz to 24 GHz. As a result, the frequency range of each carrier in the 5G NR system may be much larger than that in the LTE system. For example, in the LTE system, a frequency bandwidth is generally less than 200 MHz and the maximum bandwidth of a carrier is 20 MHz; while in the 5G NR system, a frequency bandwidth may reach 1 GHz and the maximum bandwidth of a carrier may reach 400 MHz.

Considering from the perspective of the radio frequency (RF) capability and energy conservation of the UE, the concept of band width part (BWP) is introduced in the 5G NR system. That is, for one UE, one frequency band is divided into several BWPs, and the UE is configured to work (or called activate) on at least one BWP in the same time, and is controlled by the signaling of the configured BWP, and measurement is performed thereon.

In the LTE system, the PDCCH occupies the entire frequency band in a frequency domain and occupies the first 1-3 orthogonal frequency division multiplexing (OFDM) symbols (OFDM symbols with the start location fixed as #0) of each sub-frame in a time domain. That is, as soon as the system only needs to notify the UE of the number of OFDM symbols occupied by the PDCCH, the UE is capable of determining a search space of the PDCCH. However, in the 5G NR system, due to the relatively larger bandwidth of the system (the maximum bandwidth of one carrier may reach 400 MHz), if the PDCCH still occupies the entire bandwidth, not only resources are wasted, but also high blind detection complexity is caused. In addition, for increasing system flexibility, the start location of the PDCCH in the time domain may also be configured.

Figure 2:
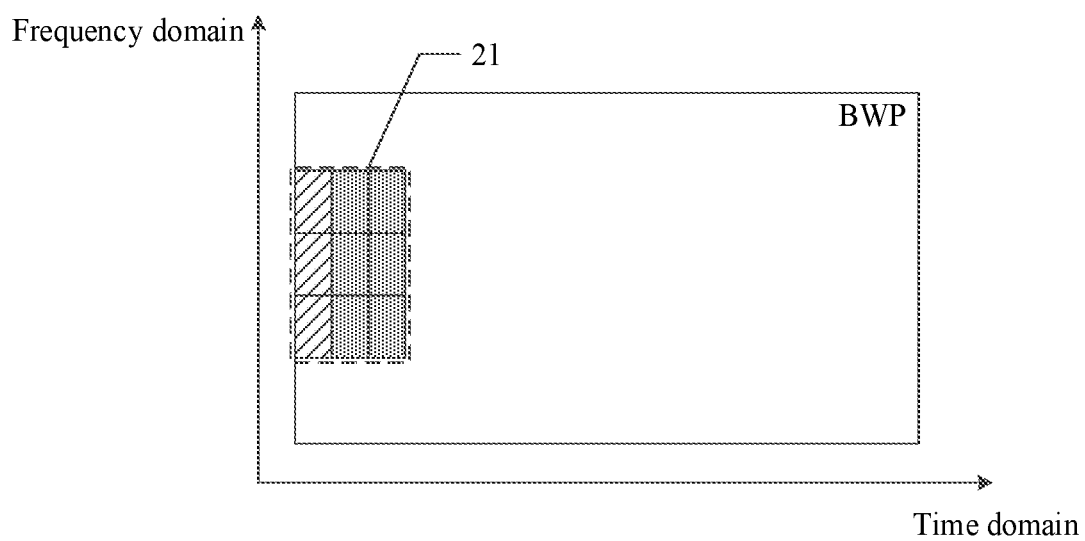
FIG. 2 exemplarily shows a relationship diagram of a BWP, a CORESET, a common search space and a UE-specific search space.

That is, in the 5G NR system, the UE may successfully decode the PDCCH only if it knows the locations of the PDCCH in the frequency domain and the time domain. For convenience, the 5G NR system encapsulates information, such as the frequency band occupied by the PDCCH in the frequency domain and the number of OFDM symbols occupied by the PDCCH in the time domain, in a control resource set (CORESET); and encapsulates information, such as the number of a start OFDM symbol of the PDCCH and a PDCCH monitoring cycle, in the search space. The CORESET exists in the BWP and is a set of all control information (including scheduling control information, reference signals, and the like). Similar to the LTE system, the concepts of a common search space and a UE-specific search space also exist in the CORESET. Reference may be made to FIG. 2 which exemplarily shows a relationship diagram of the BWP, the CORESET, the common search space and the UE-specific search space. In FIG. 2, a dashed box 21 represents the CORESET. In this CORESET, a square filled with oblique lines represents the common search space, and a square filled with black dots represents the UE-specific search space.

The common search space is a search space that all UEs need to monitor and is usually configured to send control information related to system information, paging messages, and power-control commands for a group of UEs. The UE-specific search space corresponding to a UE is a search space that this UE needs to monitor. For one UE, it only needs to monitor the UE-specific search space corresponding thereto, and does not need to monitor UE-specific search spaces corresponding to other UEs. The common search space and the UE-specific search space may overlap. UE-specific search spaces belonging to different UEs may also overlap. If the overlapping region is occupied by one UE, other UEs may no longer use these control channel element (CCE) resources.

The concept of group radio network temporary identity (RNTI) is further introduced into the 5G NR system, such that UE of a group may detect control information related thereto in a group common search space. The group common search space is also a type of common search space.

In addition, the "grant-free uplink transmission" described in the embodiment of the present disclosure refers to uplink transmission which does not require uplink scheduling every time, such as GUL transmission in the 5G NR system, or autonomous uplink (AUL) transmission in the LTE system. With the evolution of communication technologies, the "grant-free uplink transmission" may have different names. For ease of description, in the embodiment of the present disclosure, uplink transmission that does not require uplink scheduling every time is called "grant-free uplink transmission."

In the technical solutions according to the present disclosure, for the grant-free uplink transmission, a UE group is acquired by grouping UE, an access network device sends downlink feedback information in a group common search space corresponding to the UE group, and the uplink transmission success/failure of the UE group is indicated by the downlink feedback information. The technical solutions according to the present disclosure are described below with reference to several embodiments.

Figure 3:
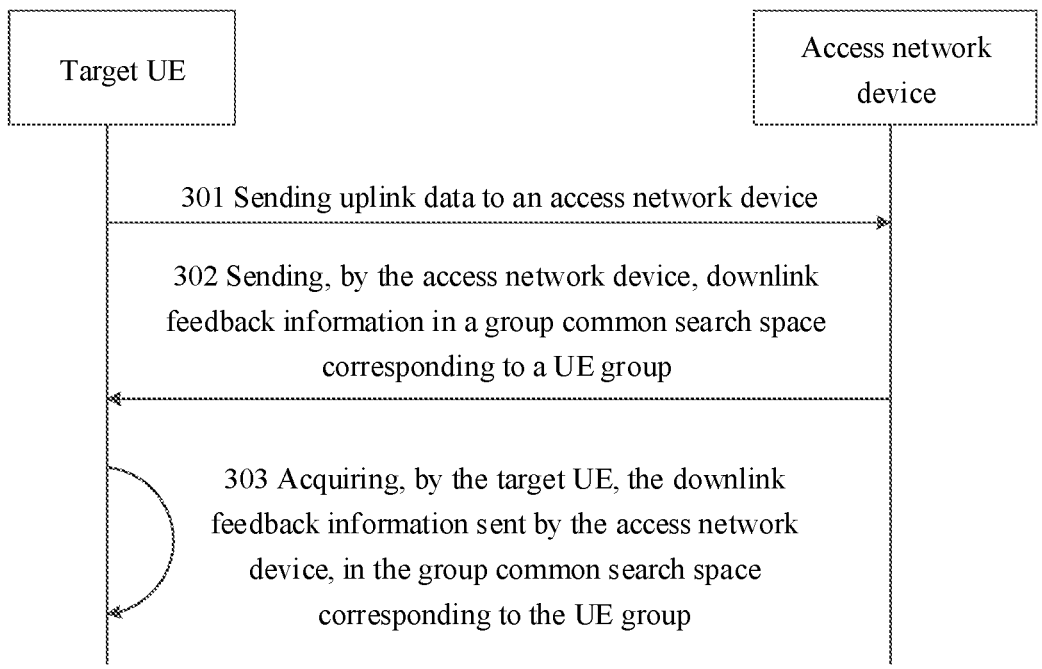
FIG. 3 is a flowchart of a feedback method for grant-free uplink transmission according to an exemplary embodiment.

FIG. 3 is a flowchart of a feedback method for grant-free uplink transmission according to an exemplary embodiment. The method may be applicable to the network architecture shown in FIG. 1. The method may include the following several steps.

In step 301, a target UE sends uplink data to an access network device.

In the embodiment of the present disclosure, the target UE is a UE in a UE group. The UE group includes n UEs, n being a positive integer. That is, the UE group may include one UE or at least two UEs. In addition, a division mode of the UE group is described in the following embodiment.

In the embodiment of the present disclosure, the technical solution of the present disclosure is only described from the perspective of the interaction between the target UE and the access network device. For any UE in the UE group, the UE may interact with the access network device with reference to steps performed by the target UE.

Accordingly, the access network device receives the uplink data sent by the UE in the UE group. By taking the target UE as an example, when having the demand of grant-free uplink transmission, the target UE sends the uplink data to the access network device. The access network device may receive the uplink data sent by at least one UE in the UE group.

In step 302, the access network device sends downlink feedback information in a group common search space corresponding to the UE group.

The downlink feedback information indicates uplink transmission success/failure of the UE group. The uplink transmission success/failure refers to whether the access network device successfully receives the uplink data sent by the UE. In the embodiment of the present disclosure, the access network device sends the downlink feedback information in the group common search space corresponding to the UE group.

In a first possible embodiment, the downlink feedback information sent by the access network device in the group common search space includes: feedback information corresponding to the target UE of the n UEs included in the UE group. The feedback information corresponding to the target UE indicates transmission success/failure of the uplink data sent by the target UE.

Figure 4:
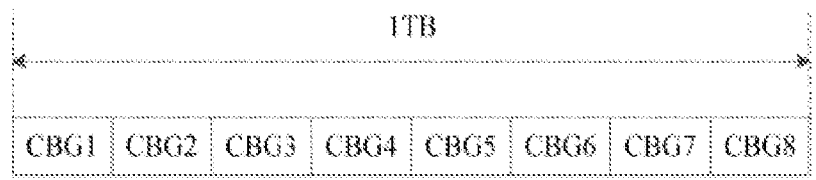
FIG. 4 is a diagram of a first sending mode of downlink feedback information involved in the embodiment in FIG. 3.

In the embodiment of the present disclosure, it is assumed that the uplink data sent by the target UE includes k CBGs, k being a positive integer. The CBG is a smaller transmission unit than the TB. One TB may include several CBGs. For example, as shown in FIG. 4, one TB may include 8 CBGs. The number of CBGs included in one TB may be decided by a service, which is not limited in the embodiment of the present disclosure. In addition, the TB is used as a retransmission unit in the LTE system, while the CBG is used as a retransmission unit in 5G NR system.

Figure 5:
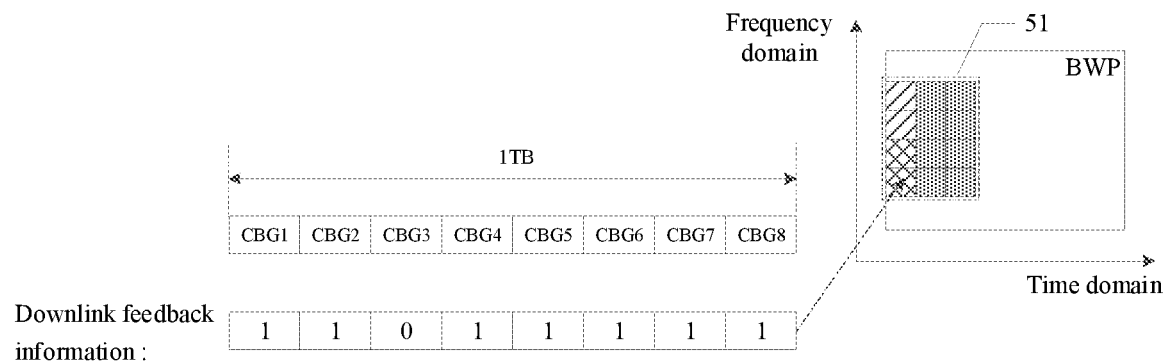
FIG. 5 is a diagram of a second sending mode of downlink feedback information involved in the embodiment in FIG. 3.

In one example, the feedback information corresponding to the target UE includes feedback information corresponding to the k CBGs respectively. The feedback information corresponding to the $w^{th}$ CBG of the k CBGs indicates transmission success/failure of the $w^{th}$ CBG, wherein w is a positive integer less than or equal to k. Optionally, the feedback information corresponding to each CBG is represented by 1 bit. Exemplarily, 1 represents transmission success and 0 represents transmission failure. Referring to FIG. 5, it is assumed that the uplink data sent by the target UE includes 8 CBGs, the feedback information corresponding to the target UE may include the feedback information corresponding to the 8 CBGs respectively. As shown in the figure, 11011111 represents that the third CBG is unsuccessfully transmitted and the other seven CBGs are successfully transmitted. In addition, in FIG. 5, a dashed box 51 represents the CORESET. In this CORESET, a square filled with oblique lines represents the common search space, a square filled with grids represents the group common search space, and a square filled with black dots represents the UE-specific search space. It can be seen from FIG. 5 that the feedback information corresponding to the target UE is sent in the group common search space corresponding to the UE group to which the target UE belongs.

Figure 6:
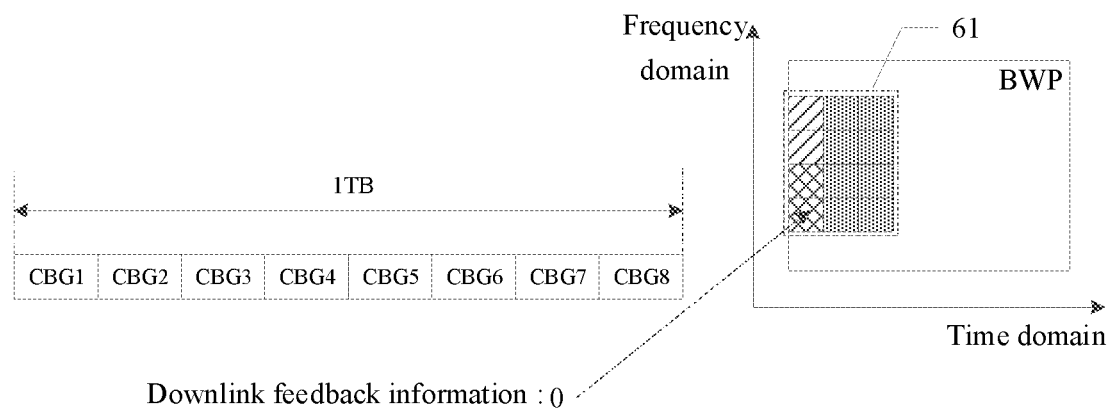
FIG. 6 is a diagram of a third sending mode of downlink feedback information involved in the embodiment in FIG. 3.

In another example, the feedback information corresponding to the target UE includes an AND operation result of feedback information corresponding to the k CBGs respectively. The feedback information corresponding to the $w^{th}$ CBG of the k CBGs indicates transmission success/failure of the $w^{th}$ CBG, wherein w is a positive integer less than or equal to k. Optionally, the feedback information corresponding to each CBG is represented by 1 bit. Exemplarily, 1 represents transmission success and 0 represents transmission failure. When all the k CBGs are successfully transmitted, the feedback information corresponding to the target UE is 1; and when at least one of the k CBGs is unsuccessfully transmitted, the feedback information corresponding to the target UE is 0. Referring to FIG. 6, it is assumed that the uplink data sent by the target UE includes 8 CBGs and the third CBG is unsuccessfully transmitted, the feedback information corresponding to the target UE is 0. In addition, in FIG. 6, a dashed box 61 represents the CORESET. In this CORESET, a square filled with oblique lines represents the common search space, a square filled with grids represents the group common search space, and a square filled with black dots represents the UE-specific search space. It can be seen from FIG. 6 that the feedback information corresponding to the target UE is sent in the group common search space corresponding to the UE group to which the target UE belongs.

It should be noted that when the UE group includes the n UEs, the downlink feedback information sent by the access network device in the group common search space corresponding to the UE group may include feedback information respectively corresponding to all UEs of the n UEs, or only include feedback information respectively corresponding to part of UEs of the n UEs. Exemplarily, the downlink feedback information only includes feedback information respectively corresponding to UE which fails in CBG transmission, and does not include feedback information corresponding to UE which is successful in CBG transmission. That is, it implicitly indicates that the uplink data sent by the UE is successfully transmitted.

In addition, when the downlink feedback information includes the feedback information corresponding to all or part of UEs of the n UEs, the feedback information corresponding to each UE may be represented by the number of CBGs of bits as shown in FIG. 5, or by 1 bit as shown in FIG. 6, or by a combination thereof. For example, for the UE which is successful in CBG transmission, the feedback information corresponding thereto is represented by 1 bit; and for the UE which fails in CBG transmission, the feedback information corresponding thereto is represented by the number of CBGs of bits. For example, for the UE which is successful in CBG transmission, the feedback information corresponding thereto is represented by 1 bit; and for the UE which fails in CBG transmission, the feedback information corresponding thereto includes both feedback information of the above 1 bit and feedback information of the above number of CBGs of bits.

Figure 7:
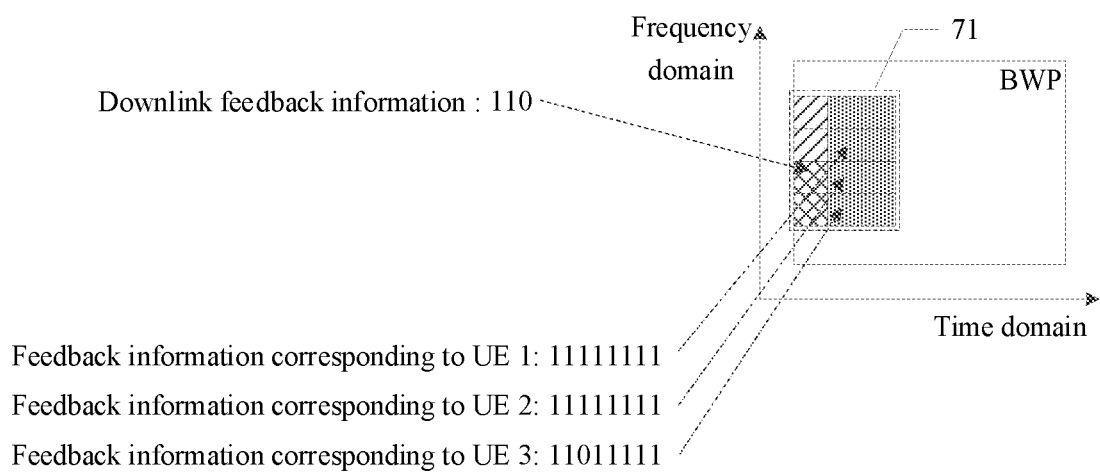
FIG. 7 is a diagram of a fourth sending mode of downlink feedback information involved in the embodiment in FIG. 3.

Optionally, if the downlink feedback information sent in the group common search space includes the feedback information corresponding to the target UE and the feedback information corresponding to the target UE is represented by an AND operation result of 1 bit, the access network device may also send the feedback information corresponding to the above k CBGs respectively in the UE-specific search space corresponding to the target UE. As shown in FIG. 7 (in FIG. 7, a dashed box 71 represents the CORESET, and the search spaces represented by differently filled squares are the same as above), it is assumed that the UE group includes three UEs, i.e., a UE 1, a UE 2 and a UE 3, and the downlink feedback information sent by the access network device in the group common search space corresponding to the UE group includes "110," the first "1" represents that CBGs included in uplink data sent by UE1 are successfully transmitted, the second "1" represents that CBGs included in uplink data sent by the UE 2 are successfully transmitted and the third "0" represents that a CBG unsuccessfully transmitted exists in uplink data sent by the UE 3. Further, the access network device may send the feedback information corresponding to the various CBGs sent by the UE 1 in a UE-specific search space corresponding to the UE 1, such as "11111111" shown in FIG. 7, which represents that the uplink data sent by the UE 1 includes 8 CBGs and the 8 CBGs are successfully transmitted. The access network device may send the feedback information corresponding to the various CBGs sent by the UE 2 in a UE-specific search space corresponding to the UE 2, such as "11111111" shown in FIG. 7, which represents that the uplink data sent by UE2 includes 8 CBGs and the 8 CBGs are successfully transmitted. The access network device may send the feedback information corresponding to the various CBGs sent by the UE 3 in a UE-specific search space corresponding to the UE 3, such as "11011111" shown in FIG. 7, which represents that the uplink data sent by the UE 3 includes 8 CBGs, the third CBG in the 8 CBGs is unsuccessfully transmitted, and the other seven CBGs are successfully transmitted.

Figure 8:
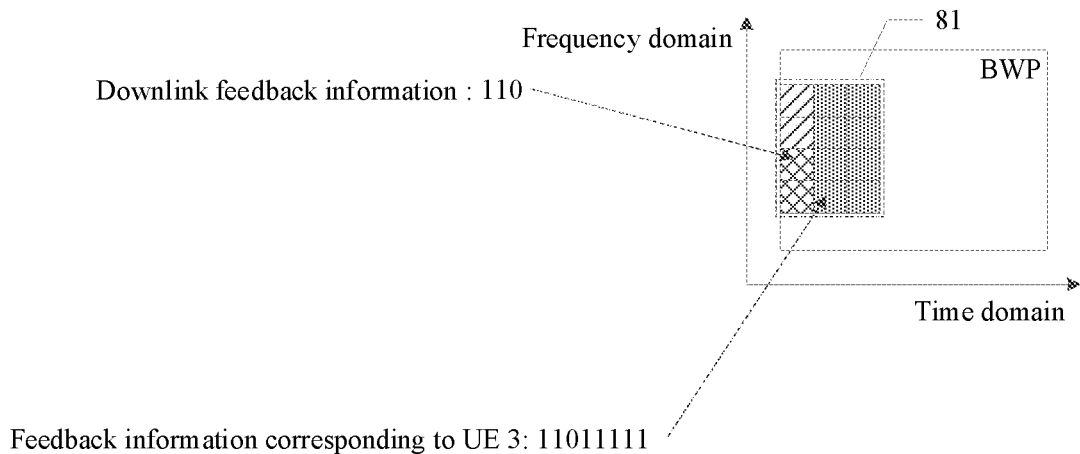
FIG. 8 is a diagram of a fifth sending mode of downlink feedback information involved in the embodiment in FIG. 3.

In the example shown in FIG. 7 above, for UEs which are successful in CBG transmission and which fail in CBG transmission, the access network device sends the feedback information corresponding to the various CBGs respectively, which are sent by the UEs in uplink transmission, in UE-specific search spaces corresponding to the UEs. In some other embodiments, for the UE which is successful in CBG transmission, the access network device does not have to send the feedback information corresponding to the various CBGs respectively, which are sent by this UE in the uplink transmission, in the UE-specific search space corresponding to the UE which is successful in CBG transmission. For the UE which fails in CBG transmission, the access network device sends the feedback information corresponding to the various CBGs respectively, which are sent by this UE in the uplink transmission, in the UE-specific search space corresponding to the UE which fails in CBG transmission so as to explicitly indicate which CBG(s) is/are unsuccessfully transmitted. For example, when the feedback information corresponding to the target UE sent in the group common search space indicates the transmission failure of the uplink data sent by the target UE, the access network device sends the feedback information corresponding to the k CBGs respectively, which are sent by the target UE in the uplink transmission, in the UE-specific search space corresponding to the target UE. By still taking three UEs, i.e., the UE 1, the UE 2 and the UE 3 in FIG. 7 as an example, it is assumed that the transmission success/failure of these three UEs is still as described above, the corresponding indication mode may be as shown in FIG. 8 (in FIG. 8, a dashed box 81 represents the CORESET, and the search spaces represented by differently filled squares are the same as the above).

In a second possible embodiment, the downlink feedback information sent by the access network device in the group common search space includes an AND operation result of feedback information respectively corresponding to m UEs of the n UEs included in the UE group, m being a positive integer less than or equal to n.

When m=n, the downlink feedback information includes an AND operation result of feedback information corresponding to all UEs respectively in the UE group; and when m<n, the downlink feedback information includes an AND operation result of feedback information corresponding to part of UEs respectively in the UE group.

The feedback information corresponding to each UE indicates transmission success/failure of uplink data sent by this UE. For example, as described above, the feedback information corresponding to the target UE indicates transmission success/failure of uplink data sent by the target UE. For the two representation modes of the feedback information corresponding to each UE, reference may be made to the introduction in the above first possible embodiment, which will not be repeatedly described herein.

Figure 9:
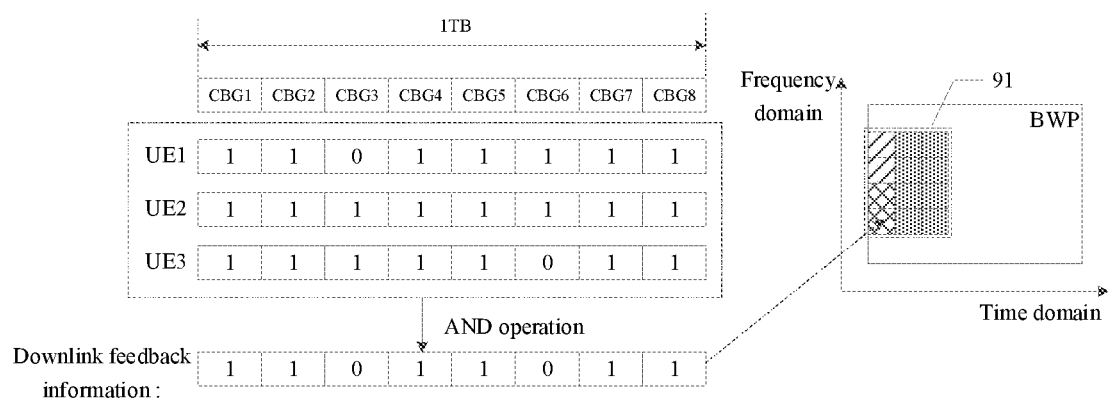
FIG. 9 is a diagram of a sixth sending mode of downlink feedback information involved in the embodiment in FIG. 3.

Referring to FIG. 9 (in FIG. 9, a dashed box 91 represents the CORESET, and the search spaces represented by differently filled squares are the same as the above) which shows that when the feedback information corresponding to each UE is represented by the number of CBGs of bits, the downlink feedback information sent by the access network device in the group common search space is also represented by the number of CBGs of bits. It is assumed that the UE group includes there UEs, i.e., the UE 1, the UE 2 and the UE 3 and the feedback information corresponding to the UE 1 is "11011111," the feedback information corresponding to the UE 2 is "11111111," the feedback information corresponding to the UE 3 is "11111011," and the AND operation result of the feedback information corresponding to the above three UEs respectively is "11011011," the access network device sends the feedback information "11011011" in the group common search space corresponding to the UE group. The above AND operation process is: an AND operation result of each location is acquired by performing an AND operation on various bits at the same location in the feedback information corresponding to the three UEs respectively, and the downlink feedback information is acquired by integrating the AND operation results of the various locations. For example, if the first bit in the feedback information corresponding to the UE 1 is "1," the first bit in the feedback information corresponding to the UE 2 is "1," and the first bit in the feedback information corresponding to the UE 3 is "1," the AND operation result acquired by performing the AND operation on the above three "1" is "1." For another example, if the third bit in the feedback information corresponding to UE1 is "0," the third bit in the feedback information corresponding to the UE 2 is "1," and the third bit in the feedback information corresponding to the UE 3 is "1," the AND operation result acquired by performing the AND operation on the above "0," "1" and "1" is "0."

In addition, when the feedback information corresponding to each UE is represented by the numbers of CBGs of bits, if the number of CBGs corresponding to the above m UEs respectively are different, the feedback information corresponding to each UE may be represented by the maximum number of CBGs of bits and vacant location(s) may be padded based on a predetermined mode.

Figure 10:
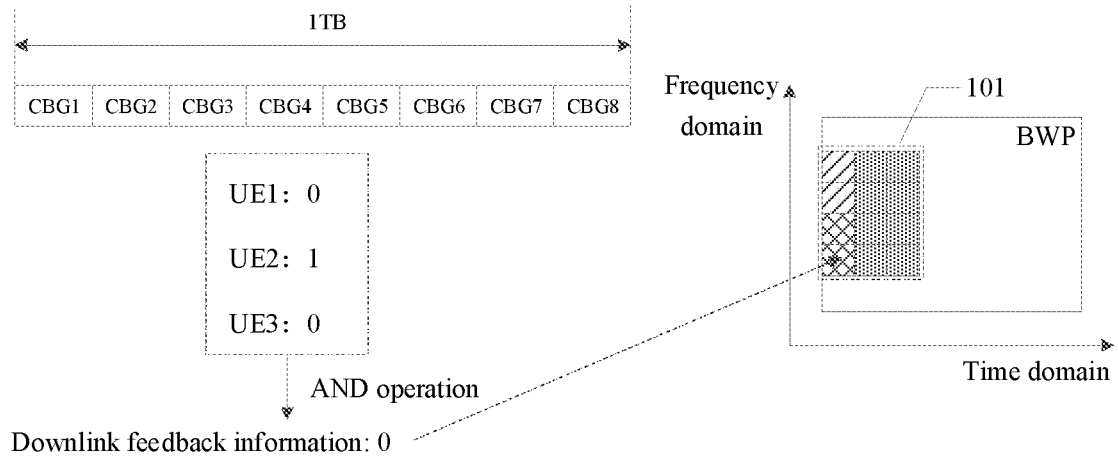
FIG. 10 is a diagram of a seventh sending mode of downlink feedback information involved in the embodiment in FIG. 3.

Referring to FIG. 10 (in FIG. 10, a dashed box 101 represents the CORESET, and the search spaces represented by differently filled squares are the same as the above) which shows that when the feedback information corresponding to each UE is represented by 1 bit, the downlink feedback information sent by the access network device in the group common search space is also represented by 1 bit. It is assumed that the UE group includes three UEs, i.e., the UE 1, the UE 2 and the UE 3, the feedback information corresponding to the UE 1 is "0," the feedback information corresponding to UE2 is "1," and the feedback information corresponding to the UE 3 is "0," the AND operation result of the feedback information corresponding to the above three UEs respectively is "0," the access network device sends the feedback information "0" in the group common search space corresponding to the UE group.

Optionally, when the above second possible implementation is adopted to represent the downlink feedback information, the access network device may also send the feedback information corresponding to the target UE in the UE-specific search space corresponding to the target UE.

Figure 11:
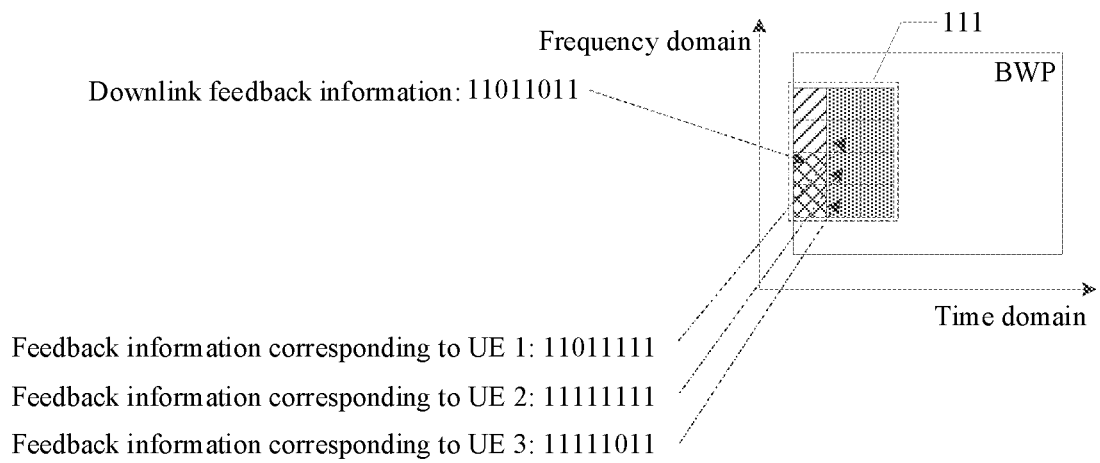
FIG. 11 is a diagram of an eighth sending mode of downlink feedback information involved in the embodiment in FIG. 3.

In one example, for each UE of the n UEs included in the UE group, the UE sends the feedback information corresponding to this UE in the UE-specific search space corresponding to this UE, and the feedback information corresponding to this UE is represented by the number of CBGs of bits. As shown in FIG. 11 (in FIG. 11, a dashed box 111 represents the CORESET, and the search spaces represented by differently filled squares are the same as the above), the downlink feedback information sent by the access network device in the group common search space is "11011011" (or "0"). In addition, the access network device sends the feedback information "11011111" corresponding to UE1 in the UE-specific search space corresponding to the UE 1, the feedback information "11111111" corresponding to the UE 2 in the UE-specific search space corresponding to the UE 2, and the feedback information "11111011" corresponding to the UE 3 in the UE-specific search space corresponding to the UE 3.

Figure 12:
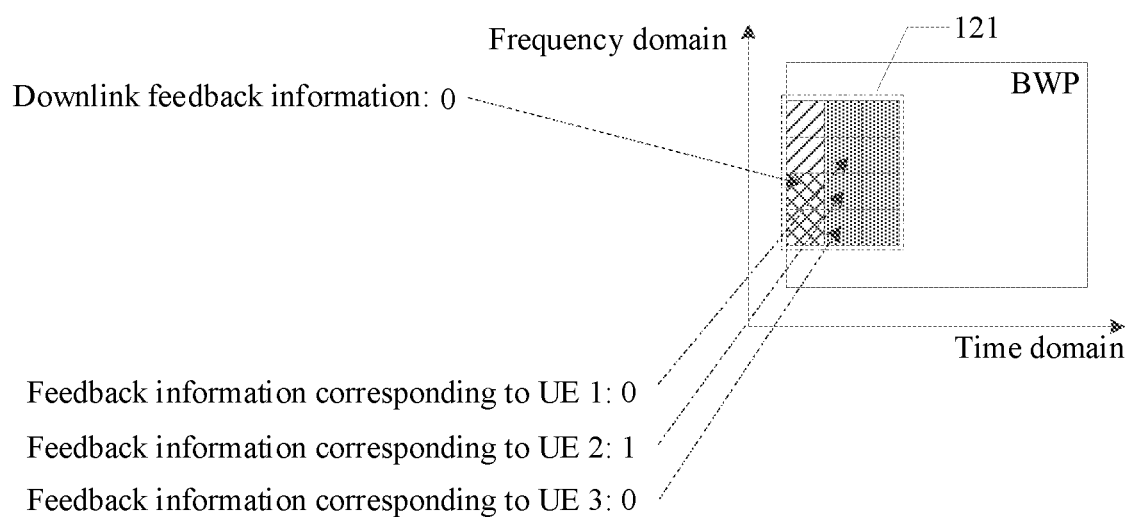
FIG. 12 is a diagram of a nineth sending mode of downlink feedback information involved in the embodiment in FIG. 3.

In another example, for each UE of the n UEs included in the UE group, the UE sends the feedback information corresponding to this UE in the UE-specific search space corresponding to this UE, and the feedback information corresponding to this UE is represented by 1 bit. As shown in FIG. 12 (in FIG. 12, a dashed box 121 represents the CORESET, and the search spaces represented by differently filled squares are the same as the above), the downlink feedback information sent by the access network device in the group common search space is "0" (or "11011011"). In addition, the access network device sends the feedback information "0" corresponding to UE1 in the UE-specific search space corresponding to UE1, the feedback information "1" corresponding to UE2 in the UE-specific search space corresponding to UE2, and the feedback information "0" corresponding to the UE 3 in the UE-specific search space corresponding to the UE 3.

Figure 13:
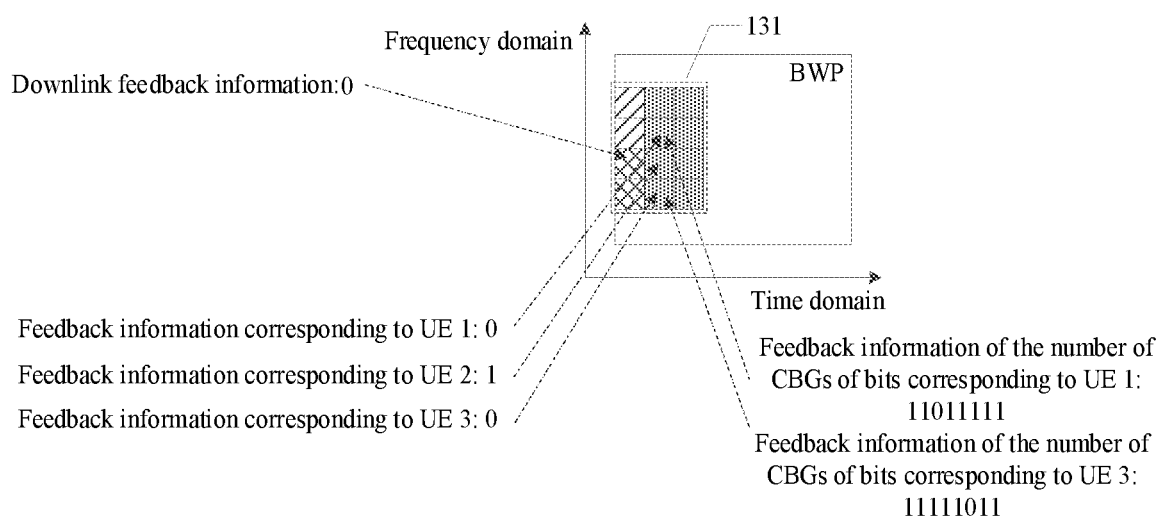
FIG. 13 is a diagram of a tenth sending mode of downlink feedback information involved in the embodiment in FIG. 3.

Optionally, when the feedback information sent by the access network device in the UE-specific search space is represented by 1 bit, for the UE which fails in CBG transmission, the access network device may also send the feedback information corresponding to various CBGs respectively, which are sent by the UE which fails in CBG transmission in the uplink transmission (i.e., the feedback information of the number of CBGs of bits as described above), in the UE-specific search space corresponding to the UE which fails in CBG transmission. As shown in FIG. 13 (in FIG. 13, a dashed box 131 represents the CORESET, and the search spaces represented by differently filled squares are the same as the above), the access network device also sends the feedback information "11011111" corresponding to various CBGs respectively, which are sent by UE1 in the uplink transmission, in the UE-specific search space corresponding to UE1, and the feedback information "11111011" corresponding to various CBGs respectively, which are sent by the UE 3 in the uplink transmission, in the UE-specific search space corresponding to the UE 3. In this way, for the UE which fails in CBG transmission, which CBG(s) is/are unsuccessfully transmitted may be explicitly indicated. It should be noted that for the same UE which fails in CBG transmission, the access network device may send the feedback information corresponding to the UE represented by 1 bit and the feedback information corresponding to various CBGs respectively represented by the number of CBGs of bits either at the same time or at different times, which is not limited in the embodiment of the present disclosure.

Figure 14:
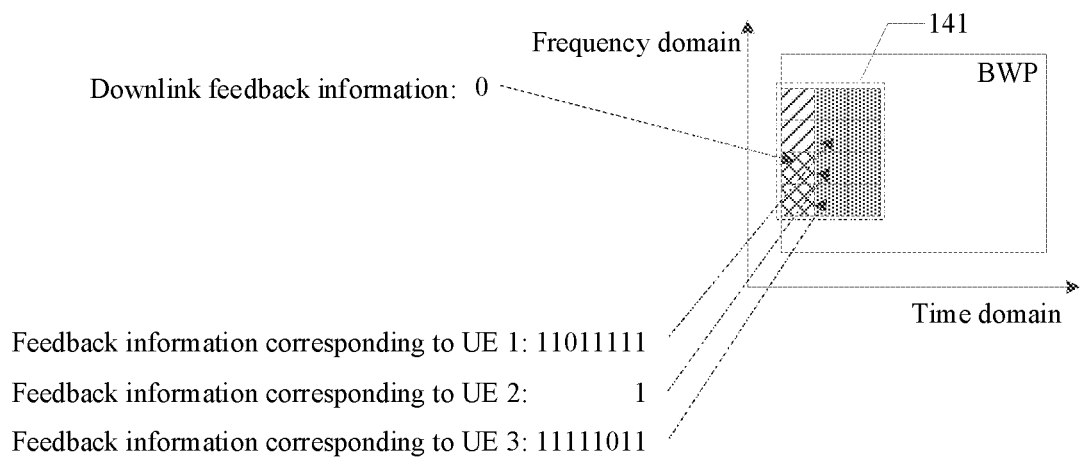
FIG. 14 is a diagram of an eleventh sending mode of downlink feedback information involved in the embodiment in FIG. 3.

In some other embodiments, as shown in FIG. 14 (in FIG. 14, a dashed box 141 represents the CORESET, and the search spaces represented by differently filled squares are the same as the above), for the UE which is successful in CBG transmission, the access network device sends the feedback information corresponding to the UE which is successful in CBG transmission in the UE-specific search space corresponding to the UE which is successful in CBG transmission and the feedback information is represented by 1 bit, while for the UE which fails in CBG transmission, the access network device sends the feedback information corresponding to the UE which fails in CBG transmission in the UE-specific search space corresponding to the UE which fails in CBG transmission and the feedback information is represented by the number of CBGs of bits, that is, the access network device feeds back the feedback information corresponding to various CBGs respectively, which are sent by the UE which fails in CBG transmission in the uplink transmission. In this way, the signaling overhead of downlink feedback of the access network devices can be reduced as much as possible.

In the examples shown in FIG. 11 to FIG. 14, for UEs which are successful in CBG transmission and fail in CBG transmission, the access network device sends the feedback information corresponding to the UEs in the UE-specific search spaces corresponding to the UEs. In some other embodiments, for the UE which is successful in CBG transmission, the access network device may not have to send the feedback information corresponding to this UE in the UE-specific search space corresponding to the UE which is successful in CBG transmission, and for the UE which fails in CBG transmission, the access network device sends the feedback information corresponding to this UE in the UE-specific search spaces corresponding to the UE which fails in CBG transmission. In this way, the reduction of the signaling overhead of downlink feedback of the access network device is further facilitated.

In step 303, the target UE acquires the downlink feedback information sent by the access network device in the group common search space corresponding to the UE group.

Each UE in the UE group may acquire the downlink feedback information sent by the access network device in the group common search space corresponding to the UE group.

Corresponding to the first possible embodiment in step 302 above, if the feedback information corresponding to the target UE which is acquired by the target UE from the group common search space indicates transmission failure of the uplink data sent by the target UE, and the feedback information corresponding to the target UE is represented by the AND operation result of the feedback information corresponding to the k CBGs respectively (i.e., represented by 1 bit), the target UE may acquire the feedback information corresponding to the k CBGs respectively, which are sent by the target UE in the uplink transmission, in the UE-specific search space corresponding to the target UE. Optionally, the target UE determines the CBG unsuccessfully transmitted based on the feedback information corresponding to the k CBGs respectively and then retransmits it.

Corresponding to the second possible embodiment in step 302 above, the target UE may also acquire the feedback information corresponding to the target UE in the UE-specific search space corresponding to the target UE. For example, when the downlink feedback information acquired by the target UE from the group common search space indicates that UE which fails in CBG transmission exists in the UE group, the target UE further acquires the feedback information corresponding to the target UE from the UE-specific search space corresponding to the target UE. Optionally, the target UE may determine the CBG unsuccessfully transmitted based on the feedback information and then retransmits the CBG.

It should be noted that in the embodiment of the present disclosure, 1 represents transmission success and 0 represents the transmission failure only. In other possible embodiments, 0 may represent transmission success and 1 may represent the transmission failure, which is not limited in the embodiment of the present disclosure. In addition, in the embodiment of the present disclosure, the feedback information corresponding to each CBG being represented by 1 bit is taken as an example. As such, the signaling overhead may be reduced as much as possible. However, the embodiment of the present disclosure does not limit that the feedback information corresponding to each CBG may also be represented by a plurality of bits.

In summary, in the technical solution according to the embodiment of the present disclosure, for the grant-free uplink transmission, the UE group is acquired by grouping UE, the access network device sends the downlink feedback information in the group common search space corresponding to the UE group, and the uplink transmission success/failure of the UE group is indicated by the downlink feedback information.

In addition, the embodiment of the present disclosure provides two ways of sending the downlink feedback information. In the first way, the access network device directly sends the feedback information corresponding to the UE in the group common search space. This technical solution is simple and the UE is capable of acquiring the feedback information corresponding to other UE in the group common search space. In the second way, the access network device indicates whether UE which fails in CBG transmission is present in the UE group by the downlink feedback information in the group common search space, and may send the feedback information corresponding to the UE in the UE-specific search space. As such, the signaling overhead of downlink feedback of the access network device may be reduced, and the power consumption of the UE for signaling demodulation is lowered.

Grouping of UEs is described hereinafter.

In one possible embodiment, the access network device allocates UE configured for grant-free uplink transmission to the same UE group. For example, for UE in a cell which is configured for grant-free uplink transmission, the access network device configures these UEs in a UE group by group RNTI. The access network device may send the group RNTI to the UE by RRC signaling or physical layer signaling.

For the sending mode of the downlink feedback information of the UE group, reference may be made to the introduction in the above embodiment. Optionally, the downlink feedback information in the group common search space may periodically appear in the group common search space based on transmission cycles of various UEs in the UE group. In addition, several UEs, whose transmission cycles meet a predetermined condition, in the UE group may share the downlink feedback information of 1 bit or the number of CBGs of bits.

In another possible embodiment, the access network device allocates n UEs, whose transmission cycles meet a predetermined condition, to the same UE group. For the sending mode of the downlink feedback information of the UE group, reference may be made to the introduction in the above embodiment.

The "predetermined condition" in the above two modes means that transmission cycles approach to each other. In addition, the transmission cycle refers to the transmission cycle in which the UE performs grant-free uplink transmission. For example, the above predetermined condition includes any one of: a time interval between transmission cycles of two UEs being less than a first threshold; and a time interval between a transmission cycle of the UE and a target time point being less than a second threshold. The first threshold and the second threshold may be pre-configured according to actual needs, which is not limited in the embodiment of the present disclosure.

Figure 15:
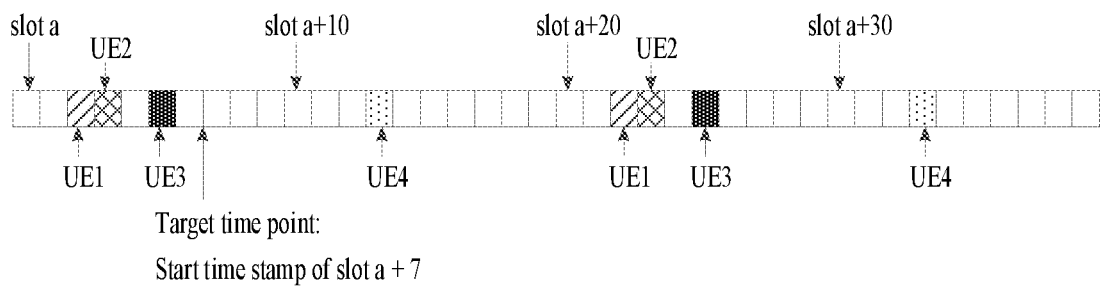
FIG. 15 exemplarily shows a distribution diagram of transmission cycles of UEs.

Referring to FIG. 15, a distribution diagram of transmission cycles of several UEs is shown.

If the above first grouping mode is adopted, a UE 1, a UE 2, a UE 3, and a UE 4 are allocated to the same UE group.

If the above second grouping mode is adopted:
1. The above predetermined condition is that the time interval between transmission cycles of two UEs is less than the first threshold. It is assumed that the first threshold is 5 slots, it can be seen from FIG. 15 that the time intervals between the transmission cycles of any two UEs in the UE 1, the UE 2 and the UE 3 are less than 5 slots, so the access network device allocates the UE 1, the UE 2 and the UE 3 to the same UE group and sends downlink feedback information in a group common search space corresponding to this UE group; and time intervals between transmission cycles of the UE 4 and any of the other three UEs are greater than 5 slots, and thus the UE 4 belongs to another UE group.
2. The predetermined condition is that the time interval between the transmission cycle of the UE and the target time point is less than the second threshold. It is assumed that the second threshold is 6 slots and the target time point is a start time stamp of slot (a+7), it can be seen from FIG. 15 that time intervals between the transmission cycles of the UE 1, the UE 2, the UE 3 and the UE 4 and the target time point are 5 slots, 4 slots, 2 slots and 7 slots respectively, so the access device allocates the UE 1, the UE 2 and the UE 3 to the same UE group and allocates the UE 4 to another UE group.

In addition, when the transmission period of any UE changes, the access network device may regroup UEs for grant-free uplink transmission so as to achieve the purpose of updating the group.

Optionally, the access network device also needs to send location information of the downlink feedback information to the UE (such as the target UE) in the UE group, and the location information indicates a location of the downlink feedback information in the group common search space. The access network device may send the above location information to the target UE by physical layer signaling, RRC signaling or medium access control (MAC) control element (CE) signaling.

Optionally, the access network device may also send switching signaling to the UE (such as the target UE) in the UE group. The switching signaling indicates whether the UE enables the function of receiving the downlink feedback information by using the technical solution of the present disclosure. For example, the switching signaling may be represented by 1 bit, 1 represents enabling, and 0 represents disenabling. In addition, if the downlink feedback information is received by using the technical solution of the present disclosure, the access network device may also inform the UE of the sending mode of the downlink feedback information. The above configuration information such as the switching signaling and sending mode may be sent to the UE by broadcast signaling, physical layer signaling, RRC signaling, or MAC CE signaling.

In addition, in the case where the UE enables the function of receiving the downlink feedback information by using the technical solution of the present disclosure, based on the introduction in the above embodiment, the UE acquires the downlink feedback information from the group common search space, and optionally, the UE further acquires the feedback information from the UE-specific search space corresponding thereto. In addition, in the case where the UE disenables the function of receiving the downlink feedback information by using the technical solution of the present disclosure, the UE may directly acquire the feedback information from the UE-specific search space corresponding thereto in a traditional mode.

In the above method embodiment, the introduction is given only from the perspective of the interaction between the access network device and the target UE. The above steps related to the access network device may be performed separately as the feedback method for grant-free uplink transmission on the access network device side. The above steps related to the target UE may be performed separately as the feedback method for grant-free uplink transmission on the target UE side.

Described hereinafter apparatus embodiments of the present disclosure, which may be used to perform the method embodiments of the present disclosure. For the details not disclosed in the apparatus embodiments of the present disclosure, reference may be made to the method embodiments of the present disclosure.

Figure 16:
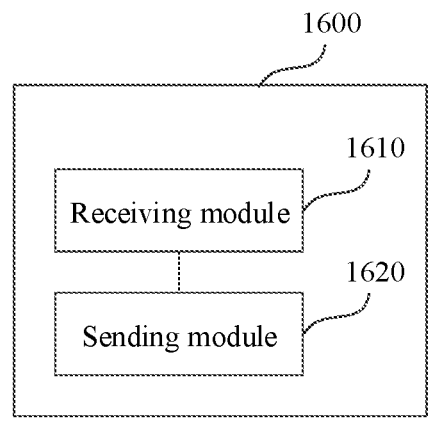
FIG. 16 is a block diagram of a feedback apparatus for grant-free uplink transmission according to one exemplary embodiment.

FIG. 16 is a block diagram of a feedback apparatus for grant-free uplink transmission according to one exemplary embodiment. The apparatus has the function of practicing the method example on the access network device side. The function may be implemented by hardware or implemented by executing corresponding software by hardware. The apparatus 1600 may include: a receiving module 1610 and a sending module 1620.

The receiving module 1610 is configured to receive uplink data sent by a UE in a UE group, wherein the UE group includes n UEs, n being a positive integer.

The sending module 1620 is configured to send downlink feedback information in a group common search space corresponding to the UE group, wherein the downlink feedback information indicates uplink transmission success/failure of the UE group.

In summary, in the technical solution according to the embodiment of the present disclosure, for the grant-free uplink transmission, the UE group is acquired by grouping the UE, the access network device sends the downlink feedback information in the group common search space corresponding to the UE group, and the uplink transmission success/failure of the UE group is indicated by the downlink feedback information.

In one optional embodiment based on the embodiment in FIG. 16, the downlink feedback information includes: feedback information corresponding to target UE of the n UEs, wherein the feedback information corresponding to the target UE indicates transmission success/failure of uplink data sent by the target UE.

In another optional embodiment based on the embodiment in FIG. 16, the downlink feedback information includes: an AND operation result of feedback information respectively corresponding to m UEs of the n UEs, m being a positive integer less than or equal to n, wherein the feedback information corresponding to a target UE of the m UEs indicates transmission success/failure of uplink data sent by the target UE.

In one example, the uplink data sent by the target UE includes k CBGs, k being a positive integer; and the feedback information corresponding to the target UE includes: feedback information corresponding to the k CBGs respectively, wherein the feedback information corresponding to a $w^{th}$ CBG of the k CBGs indicates transmission success/failure of the $w^{th}$ CBG, w being a positive integer less than or equal to k.

In another example, the uplink data sent by the target UE includes k CBGs, k being a positive integer; and the feedback information corresponding to the target UE includes: an AND operation result of feedback information corresponding to the k CBGs receptively, wherein the feedback information corresponding to a $w^{th}$ CBG of the k CBGs indicates transmission success/failure of the $w^{th}$ CBG, w being is a positive integer less than or equal to k.

Optionally, the sending module 1620 is further configured to send the feedback information corresponding to the k CBGs receptively in a UE-specific search space corresponding to the target UE when the feedback information corresponding to the target UE indicates the transmission failure of the uplink data sent by the target UE.

Optionally, the sending module 1620 is further configured to send the feedback information corresponding to the target UE in a UE-specific search space corresponding to the target UE.

In still another optional embodiment based on the embodiment in FIG. 16 or any one of above optional embodiments, the apparatus 1600 further includes: a grouping module, configured to allocate the n UEs, whose transmission cycles meet a predetermined condition, to the same UE group, wherein the predetermined condition includes any one of: a time interval between transmission cycles of two UEs being less than a first threshold; and a time interval between a transmission cycle of the UE and a target time point being less than a second threshold.

In yet still another optional embodiment based on the embodiment in FIG. 16 or any one of above optional embodiments, the sending module 1620 is further configured to send location information of the downlink feedback information to the target UE in the UE group, wherein the location information indicates a location of the downlink feedback information in the group common search space.

Figure 17:
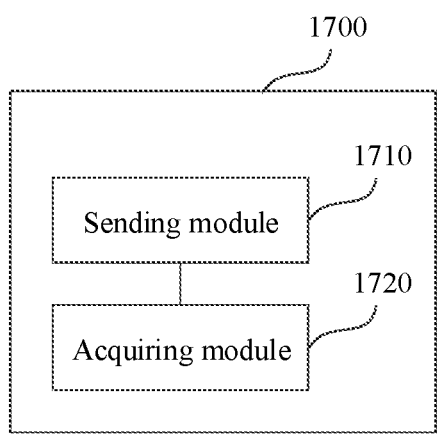
FIG. 17 is a block diagram of a feedback apparatus for grant-free uplink transmission according to another exemplary embodiment.

FIG. 17 is a block diagram of a feedback apparatus for grant-free uplink transmission according to another exemplary embodiment. The apparatus has the function of practicing the above method example on the UE side. The function may be implemented by hardware or implemented by executing corresponding software by hardware. The apparatus may be applicable to the target UE in the UE group as described above, wherein the UE group includes n UEs, n being a positive integer. The apparatus 1700 may include: a sending module 1710 and an acquiring module 1720.

The sending module 1710 is configured to send uplink data to an access network device.

The acquiring module 1720 is configured to acquire downlink feedback information sent by the access network device in a group common search space corresponding to the UE group, wherein the downlink feedback information indicates uplink transmission success/failure of the UE group.

In summary, in the technical solution according to the embodiment of the present disclosure, for the grant-free uplink transmission, the UE group is acquired by grouping the UEs, the access network device sends the downlink feedback information in the group common search space corresponding to the UE group, and the uplink transmission success/failure of the UE group is indicated by the downlink feedback information.

In one optional embodiment based on the embodiment in FIG. 17, the downlink feedback information includes: feedback information corresponding to the target UE, wherein the feedback information corresponding to the target UE indicates transmission success/failure of uplink data sent by the target UE.

In another optional embodiment based on the embodiment in FIG. 17, the downlink feedback information includes: an AND operation result of feedback information respectively corresponding to m UEs of the n UEs, m being a positive integer less than or equal to n, wherein the feedback information corresponding to the target UE of the m UEs indicates transmission success/failure of uplink data sent by the target UE.

In one example, the uplink data sent by the target UE includes k CBGs, k being a positive integer; and the feedback information corresponding to the target UE includes feedback information corresponding to the k CBGs respectively, wherein the feedback information corresponding to a $w^{th}$ CBG of the k CBGs indicates transmission success/failure of the $w^{th}$ CBG, w being a positive integer less than or equal to k.

In another example, the uplink data sent by the target UE includes k CBGs, k being a positive integer; and the feedback information corresponding to the target UE includes an AND operation result of feedback information corresponding to the k CBGs receptively, wherein the feedback information corresponding to a $w^{th}$ CBG of the k CBGs indicates transmission success/failure of the $w^{th}$ CBG, w being a positive integer less than or equal to k.

Optionally, the acquiring module 1720 is further configured to acquire the feedback information corresponding to the k CBGs receptively in a UE-specific search space corresponding to the target UE when the feedback information corresponding to the target UE indicates the transmission failure of the uplink data sent by the target UE.

Optionally, the acquiring module 1720 is further configured to acquire the feedback information corresponding to the target UE in a UE-specific search space corresponding to the target UE.

In still another optional embodiment based on the embodiment in FIG. 17 or any one of above optional embodiments, the apparatus 1700 further includes a receiving module (not shown in FIG. 17) configured to receive location information of the downlink feedback information sent by the access network device. The location information indicates a location of the downlink feedback information in the group common search space.

It should be noted that the apparatus according to the above embodiment is only illustrated by the division of various functional modules when implementing its function. In practical application, the above functions may be assigned to be completed by different functional modules according to actual needs, that is, from the perspective of structure, the device is divided into different functional modules to complete all or part of the functions described above.

With regard to the apparatus according to the above embodiment, the details about the operations performed by the respective modules have been described in detail in embodiments of the related method, which are not explained in detail herein.

An exemplary embodiment of the present disclosure also provides a feedback device for grant-free uplink transmission which is capable of performing the method on the access network device side according to the embodiment of the present disclosure. The device may be applicable to the access network device as described above. The device may include a processor, and memory configured to store at least one instruction executable by the processor. The processor is configured to: receive uplink data sent by UE in a UE group, wherein the UE group includes n UEs, n being a positive integer; and send downlink feedback information in a group common search space corresponding to the UE group, wherein the downlink feedback information indicates uplink transmission success/failure of the UE group.

Optionally, the downlink feedback information includes: feedback information corresponding to a target UE of the n UEs, wherein the feedback information corresponding to the target UE indicates transmission success/failure of uplink data sent by the target UE.

Optionally, the downlink feedback information includes: an AND operation result of feedback information respectively corresponding to m UEs of the n UEs, m being a positive integer less than or equal to n, wherein the feedback information corresponding to a target UE of the m UEs indicates transmission success/failure of uplink data sent by the target UE.

Optionally, the uplink data sent by the target UE includes k CBGs, k being a positive integer; and the feedback information corresponding to the target UE includes feedback information corresponding to the k CBGs respectively, wherein the feedback information corresponding to a $w^{th}$ CBG of the k CBGs indicates transmission success/failure of the $w^{th}$ CBG, w being a positive integer less than or equal to k.

Optionally, the uplink data sent by the target UE includes k CBGs, k being a positive integer; and the feedback information corresponding to the target UE includes an AND operation result of feedback information corresponding to the k CBGs receptively, wherein the feedback information corresponding to a $w^{th}$ CBG of the k CBGs indicates transmission success/failure of the $w^{th}$ CBG, w being a positive integer less than or equal to k.

Optionally, the processor is further configured to: send the feedback information corresponding to the k CBGs receptively in a UE-specific search space corresponding to the target UE when the feedback information corresponding to the target UE indicates the transmission failure of the uplink data sent by the target UE.

Optionally, the processor is further configured to: send the feedback information corresponding to the target UE in a UE-specific search space corresponding to the target UE.

Optionally, the processor is further configured to: allocate the n UEs, whose transmission cycles meet a predetermined condition, to the same UE group, wherein the predetermined condition includes any one of: a time interval between transmission cycles of two UEs being less than a first threshold; and a time interval between a transmission cycle of the UE and a target time point being less than a second threshold.

Optionally, the processor is further configured to: send location information of the downlink feedback information to the target UE in the UE group, wherein the location information indicates a location of the downlink feedback information in the group common search space.

An exemplary embodiment of the present disclosure also provides a feedback device for grant-free uplink transmission which is capable of performing the method on the UE side according to the embodiment of the present disclosure. The device may be applicable to the target UE in the UE group as described above. The UE group includes n UEs, n being a positive integer. The device may include a processor, and memory configured to store at least one instruction executable by the processor. The processor is configured to: send uplink data to an access network device; and acquire downlink feedback information sent by the access network device in a group common search space corresponding to the UE group, wherein the downlink feedback information indicates uplink transmission success/failure of the UE group Optionally, the downlink feedback information includes: feedback information corresponding to the target UE, wherein the feedback information corresponding to the target UE indicates transmission success/failure of uplink data sent by the target UE.

Optionally, the downlink feedback information includes: an AND operation result of feedback information respectively corresponding to m UEs of the n UEs, m being a positive integer less than or equal to n, wherein the feedback information corresponding to the target UE of the m UEs indicates transmission success/failure of uplink data sent by the target UE.

Optionally, the uplink data sent by the target UE includes k CBGs, k being a positive integer; and the feedback information corresponding to the target UE includes feedback information corresponding to the k CBGs respectively, wherein the feedback information corresponding to a $w^{th}$ CBG of the k CBGs indicates transmission success/failure of the $w^{th}$ CBG, w being a positive integer less than or equal to k.

Optionally, the uplink data sent by the target UE includes k CBGs, k being a positive integer; and the feedback information corresponding to the target UE includes an AND operation result of feedback information corresponding to the k CBGs receptively, wherein the feedback information corresponding to a $w^{th}$ CBG of the k CBGs indicates transmission success/failure of the $w^{th}$ CBG, w being a positive integer less than or equal to k.

Optionally, the processor is further configured to: acquire the feedback information corresponding to the k CBGs receptively in a UE-specific search space corresponding to the target UE when the feedback information corresponding to the target UE indicates the transmission failure of the uplink data sent by the target UE.

Optionally, the processor is further configured to: acquire the feedback information corresponding to the target UE in a UE-specific search space corresponding to the target UE.

Optionally, the processor is further configured to: receive location information of the downlink feedback information sent by the access network device, wherein the location information indicates a location of the downlink feedback information in the group common search space.

The technical solutions according to the embodiments of the present disclosure are mainly described from the perspective of interaction between the access network device and the UE. It may be understood that for implementing the above functions, the access network device and the UE include corresponding hardware structures and/or software modules for executing various functions. In conjunction with units and algorithm steps of various examples described in the embodiments of the present disclosure, the embodiments of the present disclosure may be implemented in the form of hardware or a combination of hardware and computer software. Whether certain function is implemented in the mode of hardware or in a mode that computer software drives the hardware depends on particular applications and design constraints of the technical solutions. A person skilled in the art may implement the described functions with different methods for each of particular applications, but such an implementation shall not be regarded as going beyond the scope of the technical solution according to the embodiment of the present disclosure.

Figure 18:
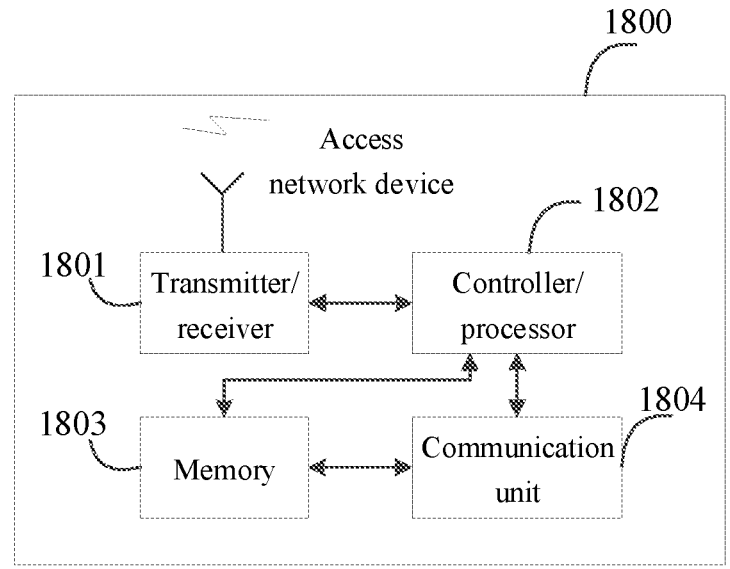
FIG. 18 is a structural diagram of an access network device according to an exemplary embodiment.

FIG. 18 is a structural diagram of an access network device according to an exemplary embodiment.

The access network device 1800 includes a transmitter/receiver 1801 and a processor 1802. The processor 1802 may also be a controller and is represented as the "controller/processor 1802" in FIG. 18. The transmitter/receiver 1801 is configured to support the transceiving of information between the access network device and the UE in the above embodiments, and to support the communication between the access network device and other network entities. The processor 1802 executes various functions for communicating with the UE. On the uplink, an uplink signal from the UE is received via an antenna, demodulated by the receiver 1801 (for example, a high-frequency signal is demodulated into a baseband signal), and further processed by the processor 1802 to resume service data and signalling information sent by the UE. On the downlink, the service data and a signalling message are processed by the processor 1802, and modulated by the transmitter 1801 (for example, the baseband signal is modulated into the high-frequency signal) to generate a downlink signal, which is transmitted to the UE via the antenna. It should be noted that the above demodulation or modulation function may also be completed by the processor 1802. For example, the processor 1802 is further configured to perform various steps on the access network device side in the above method embodiment, and/or other steps of the technical solutions described in the embodiments of the present disclosure.

Further, the access network device 1800 may also include memory 1803 for storing a program code and data of the access network device 1800. In addition, the access network device 1800 may further include a communication unit 1804. The communication unit 1804 is configured to support communication between the access network device 1800 and other network entities (such as network devices in a core network). For example, in the 5G NR system, the communication unit 1804 may be an NG-U interface for supporting communication of the access network device 1800 with a user plane function (UPF) entity; or an NG-C interface for supporting communication of the access network device 1800 with an access and mobility management function (AMF) entity.

It may be understood that FIG. 18 only shows simplified design of the access network device 1800. In practical application, the access network device 1800 may include any number of transmitters, receivers, processors, controllers, memories, communication units and the like, and all access network devices that may implement the embodiments of the present disclosure are within the scope of protection of the embodiments of the present disclosure.

Figure 19:
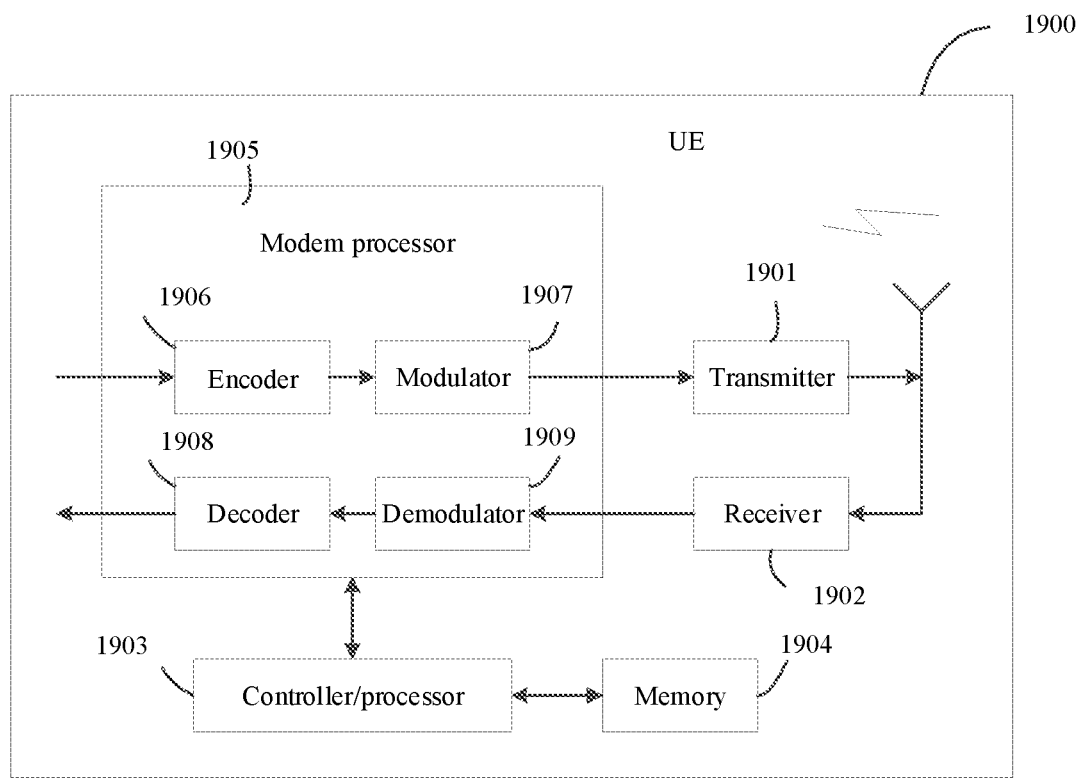
FIG. 19 is a structural diagram of a UE according to an exemplary embodiment.

FIG. 19 is a structural diagram of a UE according to an exemplary embodiment.

The UE 1900 includes a transmitter 1901, a receiver 1902 and a processor 1903. The processor 1903 may also be a controller and is represented as the "controller/processor 1903" in FIG. 19. Optionally, the UE 1900 may also include a modem processor 1905. The modem processor 1905 may include an encoder 1906, a modulator 1907, a decoder 1908, and a demodulator 1909.

In one example, the transmitter 1901 adjusts (for example, performs analogue conversion on, filters, amplifies and up-converts) output sampling and generates an uplink signal. The uplink signal is transmitted via an antenna to the access network device described in the above embodiment. On the downlink, the antenna receives a downlink signal transmitted by the access network device in the above embodiment. The receiver 1902 adjusts (for example, filters, amplifies, down-converts and digitizes) the signal received from the antenna and provides input sampling. In the modem processor 1905, the encoder 1906 receives service data and a signaling message to be sent on the uplink and processes (for example, formats, encodes and interleave) the service data and the signaling message. The modulator 1907 further processes (for example, symbol maps and modulates) the encoded service data and signaling message and provides output sampling. The demodulator 1909 processes (for example, demodulates) the input sampling and provides symbol estimation. The decoder 1908 processes (for example, deinterleaves and decodes) the symbol estimation and provides the decoded data and signaling message sent to the UE 1900. The encoder 1906, the modulator 1907, the demodulator 1909, and the decoder 1908 may be implemented by the combined modem processor 1905. These units perform processing according to wireless access technologies (such as access technologies of LTE and other evolution systems) adopted by the wireless access network. It should be noted that when the UE 1900 does not include the modem processor 1905, the above functions of the modem processor 1905 may also be completed by the processor 1903.

The processor 1903 controls and manages the actions of the UE 1900, and is configured to perform the operations performed by the UE 1900 in the embodiment of the present disclosure above. For example, the processor 1903 is further configured to perform various steps on the UE side in the above method embodiment, and/or other steps of the technical solutions described in the embodiments of the present disclosure.

Further, the UE 1900 may also include memory 1904 for storing a program code and data for the UE 1900.

It may be understood that FIG. 19 only shows simplified design of the UE 1900. In practical application, the UE 1900 may include any number of transmitters, receivers, processors, modem processors, memories, and the like, and all UEs capable of implementing the embodiments of the present disclosure are within the scope of protection of the embodiments of the present disclosure.

An embodiment of the present disclosure further provides a non-transitory computer-readable storage medium. The non-transitory computer-readable storage medium stores at least one computer program thereon. The at least one computer program, when loaded and run by a processor of an access network device, causes the access network device to perform the feedback method for grant-free uplink transmission on the access network device side as described above.

An embodiment of the present disclosure further provides a non-transitory computer-readable storage medium. The non-transitory computer-readable storage medium stores at least one computer program thereon. The at least one computer program, when loaded and run by a processor of a UE, causes the UE to perform the feedback method for grant-free uplink transmission on the UE side as described above.

It should be understood that the term "a plurality of" mentioned herein means two or more. The term "and/or" describes an association relationship of associated objects, indicating three relationships. For example, A and/or B may indicate three situations: A exists alone, A and B exist simultaneously, and B exists alone. The symbol "/" generally indicates an "OR" relationship between the associated objects.

Other embodiments of the present disclosure will be apparent to those skilled in the art from consideration of the description and practice of the present disclosure. The present disclosure is intended to cover any variations, uses, or adaptations of the present disclosure following general principles of the present disclosure and including the common knowledge or conventional technical means in the art which is not disclosed in the present disclosure. The description and embodiments are to be considered as exemplary only, with a true scope and spirit of the present disclosure being subject to the appended claims.

It should be understood that the present disclosure is not limited to the exact constructions that has been described above and shown in the accompanying drawings, and that various modifications and changes may be made without departing from the scope thereof. The scope of the present disclosure is only subject to the appended claim.

What is claimed is:

1. A feedback method for grant-free uplink transmission, comprising:
    allocating, by an access network device, n UEs, whose transmission cycles meet a predetermined condition, to the same UE group, wherein n is a positive integer and the predetermined condition comprises: a time interval between transmission cycles of two UEs being less than a first threshold;
    receiving, by the access network device, uplink data sent by a user equipment UE in the UE group; and
    sending, by the access network device, downlink feedback information in a group common search space corresponding to the UE group, wherein the downlink feedback information indicates uplink transmission success/failure of the UE group.

2. The method according to claim 1, wherein the downlink feedback information comprises: feedback information corresponding to a target UE of the n UEs, wherein the feedback information corresponding to the target UE indicates transmission success/failure of uplink data sent by the target UE.

3. The method according to claim 2, wherein the uplink data sent by the target UE comprises k code block groups CBGs, k being a positive integer; and
    the feedback information corresponding to the target UE comprises: feedback information corresponding to the k CBGs respectively, wherein the feedback information corresponding to a $w^{th}$ CBG of the k CBGs indicates transmission success/failure of the $w^{th}$ CBG, w being a positive integer less than or equal to k.

4. The method according to claim 2, wherein the uplink data sent by the target UE comprises k code block groups CBGs, k being a positive integer; and
    the feedback information corresponding to the target UE comprises: an AND operation result of feedback information corresponding to the k CBGs receptively, wherein the feedback information corresponding to a $w^{th}$ CBG of the k CBGs indicates transmission success/failure of the $w^{th}$ CBG, w being a positive integer less than or equal to k.

5. The method according to claim 4, further comprising: sending, by the access network device, the feedback information corresponding to the k CBGs receptively in a UE-specific search space corresponding to the target UE when the feedback information corresponding to the target UE indicates the transmission failure of the uplink data sent by the target UE.

6. The method according to claim 1, wherein the downlink feedback information comprises: an AND operation result of feedback information respectively corresponding to m UEs of the n UEs, m being a positive integer less than or equal to n, wherein
    the feedback information corresponding to a target UE of the m UEs indicates transmission success/failure of uplink data sent by the target UE.

7. The method according to claim 6, further comprising: sending, by the access network device, the feedback information corresponding to the target UE in a UE-specific search space corresponding to the target UE.

8. The method according to claim 1,
    wherein
    the predetermined condition further comprises: a time interval between a transmission cycle of the UE and a target time point being less than a second threshold.

9. The method according to claim 1, further comprising: sending, by the access network device, location information of the downlink feedback information to the target UE in the UE group, wherein the location information indicates a location of the downlink feedback information in the group common search space.

10. A feedback method for grant-free uplink transmission, the method being applicable to a target user equipment UE in a UE group, wherein the UE group is obtained by allocating n UEs whose transmission cycles meet a predetermined condition to the same UE group, n being a positive integer, and the predetermined condition comprising: a time interval between transmission cycles of two UEs being less than a first threshold; and the method comprises:
    sending, by the target UE, uplink data to an access network device; and
    acquiring, by the target UE, downlink feedback information sent by the access network device in a group common search space corresponding to the UE group, wherein the downlink feedback information indicates uplink transmission success/failure of the UE group.

11. The method according to claim 10, wherein the downlink feedback information comprises: feedback information corresponding to the target UE, wherein the feedback information corresponding to the target UE indicates transmission success/failure of uplink data sent by the target UE.

12. The method according to claim 11, wherein the uplink data sent by the target UE comprises k code block groups CBGs, k being a positive integer; and
    the feedback information corresponding to the target UE comprises: feedback information corresponding to the k CBGs respectively, wherein the feedback information corresponding to a $w^{th}$ CBG of the k CBGs indicates transmission success/failure of the $w^{th}$ CBG, w being a positive integer less than or equal to k.

13. The method according to claim 11, wherein the uplink data sent by the target UE comprises k code block groups CBGs, k being a positive integer; and
    the feedback information corresponding to the target UE comprises: an AND operation result of feedback information corresponding to the k CBGs receptively, wherein the feedback information corresponding to a $w^{th}$ CBG of the k CBGs indicates transmission success/failure of the $w^{th}$ CBG, w being a positive integer less than or equal to k.

14. The method according to claim 13, further comprising: acquiring, by the target UE, the feedback information corresponding to the k CBGs receptively in a UE-specific search space corresponding to the target UE when the feedback information corresponding to the target UE indicates the transmission failure of the uplink data sent by the target UE.

15. The method according to claim 10, wherein the downlink feedback information comprises: an AND operation result of feedback information respectively corresponding to m UEs of the n UEs, m being a positive integer less than or equal to n, wherein
    the feedback information corresponding to the target UE of the m UEs indicates transmission success/failure of uplink data sent by the target UE.

16. The method according to claim 15, further comprising: acquiring, by the target UE, the feedback information corresponding to the target UE in a UE-specific search space corresponding to the target UE.

17. The method according to claim 10, further comprising: receiving, by the target UE, location information of the downlink feedback information sent by the access network device, wherein the location information indicates a location of the downlink feedback information in the group common search space.

18. A feedback device for grant-free uplink transmission, the device being applicable to an access network device and comprising:
a processor; and
memory configured to store at least one instruction executable by the processor, wherein
the processor is configured to:
allocate n UEs, whose transmission cycles meet a predetermined condition, to the same UE group, wherein n is a positive integer and the predetermined condition comprises: a time interval between transmission cycles of two UEs being less than a first threshold;
receive uplink data sent by a user equipment UE in the UE group; and
send downlink feedback information in a group common search space corresponding to the UE group, wherein the downlink feedback information indicates uplink transmission success/failure of the UE group.

19. A non-transitory computer-readable storage medium, storing at least one computer program thereon, wherein the at least one computer program, when loaded and run by a processor, causes the processor to perform steps of the method according to claim 1.

20. A feedback device for grant-free uplink transmission implementing the method according to claim 10, and the device comprising:
a processor; and
memory configured to perform steps of the method.

* * * * *